(12) United States Patent
Lozano et al.

(10) Patent No.: US 10,628,646 B1
(45) Date of Patent: Apr. 21, 2020

(54) OFF-AXIS DUAL-SENSOR VISION SYSTEM CAMERA AND METHOD FOR USING THE SAME

(71) Applicant: Cognex Corporation, Natick, MA (US)

(72) Inventors: Esther Oteo Lozano, Aachen (DE); Laurens Nunnink, Simpleveld (NL)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/859,298

(22) Filed: Dec. 29, 2017

(51) Int. Cl.
  *G06K 7/14* (2006.01)
  *H04N 5/225* (2006.01)
  *G06K 7/10* (2006.01)

(52) U.S. Cl.
  CPC ....... *G06K 7/1417* (2013.01); *G06K 7/10881* (2013.01); *H04N 5/2252* (2013.01); *H04N 5/2256* (2013.01); *H04N 5/2258* (2013.01)

(58) Field of Classification Search
  CPC ............. G06K 7/1417; G06K 7/10881; H04N 5/2252; H04N 5/2258; H04N 5/2256
  USPC ....................................................... 235/462.1
  See application file for complete search history.

(56) References Cited

U.S. PATENT DOCUMENTS

| | | | |
|---|---|---|---|
| 4,960,314 A | 10/1990 | Smith | |
| 5,015,069 A | 5/1991 | Bryan | |
| 5,016,950 A | 5/1991 | Smith | |
| 5,064,286 A | 11/1991 | Ai | |
| 5,461,417 A | 10/1995 | White | |
| 5,783,752 A | 7/1998 | Thorburn | |
| 6,724,535 B1 | 4/2004 | Clabburn | |
| 6,884,993 B2 | 4/2005 | Ahten | |
| 7,281,662 B2 | 10/2007 | He | |
| 7,857,224 B2 | 12/2010 | Lei | |
| 7,877,003 B2 | 1/2011 | Dunn | |
| 7,886,979 B2 | 2/2011 | Lei | |
| 7,978,970 B2 | 7/2011 | Pastore | |
| 8,011,583 B2 | 9/2011 | Lei | |
| 8,028,913 B2 | 10/2011 | Liu | |
| 8,032,017 B2 | 10/2011 | Pastore | |
| 8,224,174 B2 | 7/2012 | Pastore | |
| 8,878,924 B2 * | 11/2014 | Farr | A61B 1/00103 348/80 |
| 9,159,942 B2 | 10/2015 | Seo | |
| 9,569,653 B1 * | 2/2017 | Suman | G06K 7/10732 |

(Continued)

*Primary Examiner* — Seung H Lee
(74) *Attorney, Agent, or Firm* — Loginov IP (57) ABSTRACT

This invention overcomes disadvantages of the prior art by providing, vision system, typically in the form of a handheld ID reader, which can include two imaging systems, a first imaging system that is off-axis and a second imaging system that is on-axis. The on-axis imaging system is typically standard in configuration, and can be used, for example, with a polarized illumination system. The off-axis imaging system is intended to minimize the camera reflection footprint on a (typically rounded) shiny object to enhance reading of small feature sets (e.g. DMP codes). The off-axis imaging system includes a diffusive illumination source with an emitter in the form of a concave surface, such as a semi-cylinder or dome. Combining images from the two imaging systems allows the contrast of the imaged feature set to be optimized, and provide superior reading and decoding of small codes on shiny rounded surfaces—such as DPM codes.

21 Claims, 5 Drawing Sheets

(56) References Cited

U.S. PATENT DOCUMENTS

| | | | |
|---|---|---|---|
| 2004/0159703 A1* | 8/2004 | Kogan | G02B 7/04 |
| | | | 235/454 |
| 2004/0173681 A1* | 9/2004 | Toyama | G06K 7/10732 |
| | | | 235/454 |
| 2008/0137325 A1 | 6/2008 | Pastore | |
| 2012/0092131 A1* | 4/2012 | Vasic | G02B 6/0045 |
| | | | 340/10.1 |
| 2014/0261627 A1 | 9/2014 | Meitl | |
| 2014/0376003 A1* | 12/2014 | Keranen | G01B 11/245 |
| | | | 356/610 |
| 2019/0188432 A1* | 6/2019 | Lozano | G06K 7/10386 |

* cited by examiner

OFF-AXIS DUAL-SENSOR VISION SYSTEM CAMERA AND METHOD FOR USING THE SAME

FIELD OF THE INVENTION

This invention relates to machine vision systems for use in finding and decoding ID codes on objects, and more particularly to cameras for such vision systems.

BACKGROUND OF THE INVENTION

Vision systems that perform measurement, inspection, alignment of objects and/or decoding of symbology in the form of machine-readable symbols (also termed "IDs", such as a 2D matrix symbol) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

In operation, an ID reader typically functions to illuminate the scene containing one or more IDs. The illuminated scene is then acquired by an image sensor within the imaging system through optics. The array sensor pixels are exposed, and the electronic value(s) generated for each pixel by the exposure is/are stored in an array of memory cells that can be termed the "image" of the scene. In the context of an ID-reading application, the scene includes an object of interest that has one or more IDs of appropriate dimensions and type. The ID(s) are part of the stored image.

While many applications for ID readers can employ a fixed mount arrangement, with objects moving through an imaged scene, a common type of ID reader is a handheld arrangement, with or without a "pistol grip" handle. Such readers are used by workers to read IDs on (typically) stationary objects (parts) in a warehouse or other repository. Such readers can also be used to identify ID-coded parts in an assembly (e.g. an automobile on a production line), or for any other application that benefits from identifying and/or tracking components/parts. In general, working distances, illumination and other parameters for such readers can vary as a user moves from part-to-part and it is desirable that a reader have the capability to handle such variations.

More particularly, to better image ID codes, particularly those on shiny (i.e. reflective) rounded surfaces (e.g. Direct Part Marking, or "DPM" codes), special lighting is desirable. Several approaches have been provided to assist in reading such codes—for example, diffusive lighting, low-angle light, polarized light and/or structured light. This specialized lighting can be used in conjunction with another, conventional illuminator. However, none of these approaches has fully addressed two significant challenges in reading (e.g.) DPM codes on round/curvilinear surfaces, namely (a) eliminating the reflection of the reader's camera in the background (a.k.a. the black hole or stripe) when reading DPM codes on shiny, rounded surfaces, and (b) enabling image capture with a plurality of discrete/differing illumination sources simultaneously, so as to improve the overall acquisition (trigger-to-beep) time.

SUMMARY OF THE INVENTION

This invention overcomes disadvantages of the prior art by providing, vision system, typically in the form of a handheld ID reader, which can include two imaging systems, a first imaging system that is off-axis and a second imaging system that is on-axis. The on-axis imaging system is typically standard in configuration, and can be used, for example, with a polarized illumination system. The off-axis imaging system is intended to minimize the camera reflection footprint on a (typically rounded) shiny object to enhance reading of small feature sets (e.g. DMP codes). The off-axis imaging system includes a diffusive illumination source with an emitter in the form of a concave surface, such as a semi-cylinder or dome. Combining images from the two imaging systems allows the contrast of the imaged feature set to be optimized, and provide superior reading and decoding of small codes on shiny rounded surfaces—such as DPM codes. The vision system device includes a diffusive illumination emitter with an off-axis sensor and optics having a different optical axis from an axis of symmetry of the emitter. Hence, the full device optical axis (aligned generally with the axis of symmetry) defines a non-zero angle with respect to the optical axis of the off-axis optics and sensor optical. This non-zero angle is defined so that, for shiny surfaces, the shadow or footprint of the imaging system is outside of the imaged code. This enhances the contrast on the code improving its decodability.

In an illustrative embodiment, this invention provides a vision system for imaging an object using a diffusive illuminator. The system includes a first imaging system having a first image sensor, and first optics defining a first optical axis with respect to the object. The diffusive illumination emitter defines a concave shape along a face thereof facing the object. The concave shape defines a diffuser optical axis discrete from the first optical axis with respect to a center of curvature of the concave shape. The diffuser optical axis is located on the first optical axis and defining the location of the feature of interest on the object. The diffusive (also termed "diffuse") illumination is completely located at one side of at least one plane containing the first optical axis. The first imaging system is also contained in a housing defining a device optical axis. Illustratively, the diffusive illumination emitter defines a dome shape or a semi-cylinder shape. The device optical axis can be defined with respect to an aimer beam or a mechanical geometric reference on the housing. The system further includes a vision system housing adapted for handheld use and has at least one of (a) an aimer illumination source and (b) a mechanical geometric reference that assists a user in orienting the housing with respect to features of interest on the object. The mechanical geometric reference can comprise at least one of (a) visible lines on the housing, (b) a parting line between a parts of the housing, and (c) a flat surface or window on a front side of the housing. The object can define a rounded surface and the features of interest comprise an ID code, and the ID code can more particularly comprise a DPM code. The system can include a second imaging system having a second image sensor and second optics having a second optical axis. The second optical axis can be on-axis with the device optical axis, adjacent to the object. The second imaging system can project a structured-light or collimated-light aimer beam for orienting the vision system with respect to the object. Illustratively, the second optical axis is brought together, on-axis, with the device optical axis by an optical component that bends light from a first path to a second path. The optical component can comprise a beam splitter and/or a dichroic filter. The diffusive illumination emitter can project light having a first wavelength, and the second imaging system projects light having a second wavelength, in which the first wavelength is discrete from the second wavelength. The light projected by the second imaging system can be polarized in a first direction, and the second imaging system is sensitive to polarized light in a direction approximately perpendicular to the first direction. The structured-light or collimated-light aimer beam can be polarized in a first direction, and the second imaging system can be sensitive to polarized light in a direction perpendicular to the first direction. Illustratively, the first image sensor and first optics can be configured in a Scheimpflug configuration with respect to the device optical axis. Also, at least one of the first optics and the second optics can include an adjustable-focus variable lens. The variable lens can comprise a liquid lens. In embodiments, the system can also include a low-angle light illumination system

BRIEF DESCRIPTION OF THE DRAWINGS

The invention description below refers to the accompanying drawings, of which.

DETAILED DESCRIPTION

Figure 1:
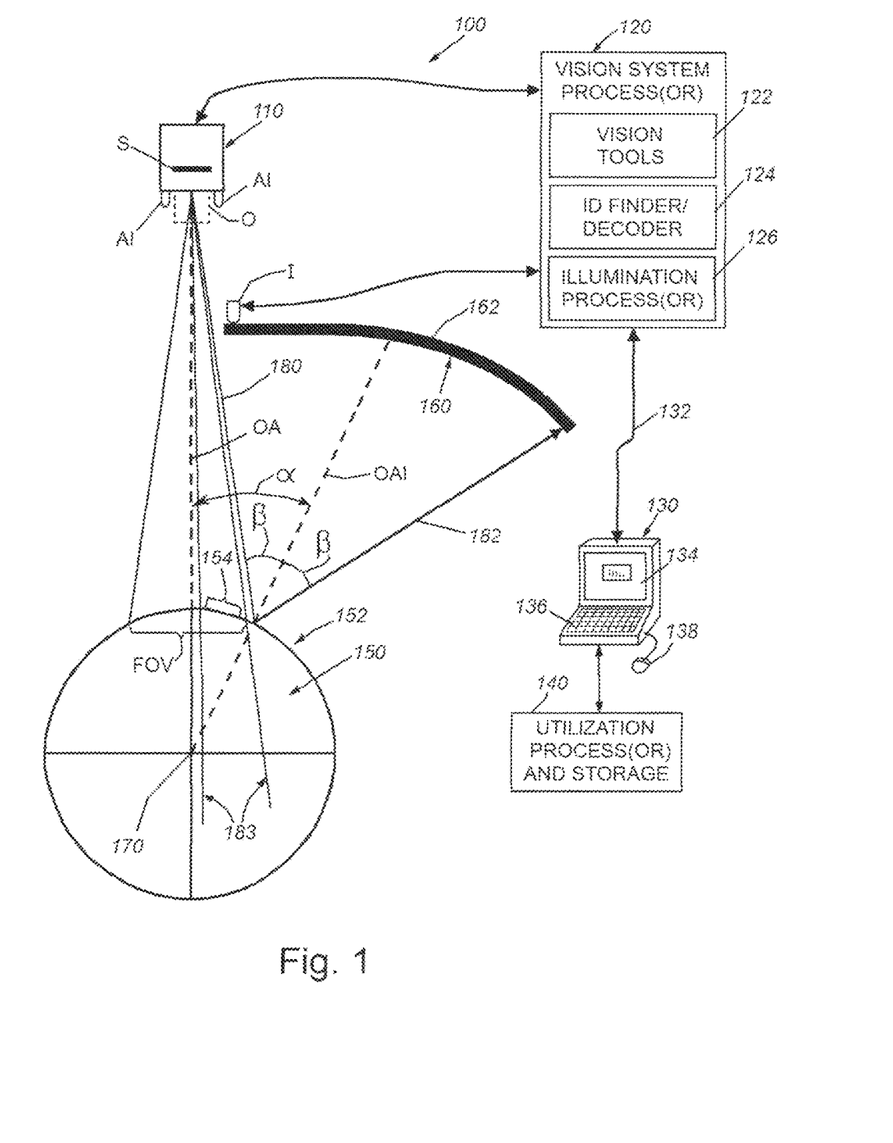
FIG. 1 is a diagram of a generalized vision system for reading and decoding features (e.g. Direct Part Marking (DPM) codes) located on shiny/reflective rounded surfaces, including a diffusive illuminator arranged in an off-axis configuration, according to an illustrative embodiment.

FIG. 1 shows a vision system arrangement 100 that is adapted to capture images and decode features with respect to a shiny (i.e. reflective) rounded surface according to an exemplary embodiment. The system 100 includes a vision system camera assembly 110 with a (e.g. two-dimensional (2D)) sensor S and associated lens optics O. The vision system camera assembly 110 transmits captured images to a vision system process(or) 120 that can be instantiated within the camera assembly entirely, or partially/fully located remote from the camera assembly—for example in a general-purpose computing device 130, such as a PC, server, laptop, tablet or handheld device (e.g. smartphone). Such device can also be intermittently connected via an appropriate (e.g. wired or wireless) network link 132 for setup and/or runtime control and data acquisition. Such a device 130 can also include and appropriate user interface, including a display and/or touchscreen 134, keyboard 136 and mouse 138. Acquired data (e.g. decoded IDs) is transferred from the processor 120 and/or the device 130 to a utilization device or process(or) 140, that can include tracking and/or logistics software or other data-handling/storage applications.

The vision system process(or) 120 can include various functional processor and associated processes or modules. By way of non-limiting example, such processes/modules can include a plurality of vision tools 122, including edge-finders, blob analyzers, calipers, pattern recognition tools, etc. Vision system tools are commercially available from a variety of vendors, such as Cognex Corporation, of Natick, Mass. The process(or) 120 can also include an ID (or other feature) finder and decoder 124, that uses information retrieved by the vision tools from acquired images to locate ID candidates (e.g. DPM codes) and decode successfully identified candidates to extract alphanumeric (and other) information. The processor can also include various camera control processor and associated processes/modules, including a trigger and an illumination process(or) 126. This is used to control image acquisition and operation of the illumination system that projects appropriate light onto the surface of an imaged object 150.

The depicted object 150 defines a rounded or round (e.g. cylindrical) surface 152, such as a motor shaft or gear stem. By way of example, the surface can be metallic, and moderately or highly smooth, which renders it relatively shiny/reflective. This reflectivity can be challenging when attempting to acquire a useable image of a future set (e.g. a DPM code) 154 formed on the surface 152. As shown, the exemplary features 154 reside within the field of view FOV of the camera assembly 110, which is defined around an optical axis OA. The FOV is highly variable depending upon the type of optics employed and the focal distance. Note that the optics O in this exemplary depiction is arranged in a straight-line configuration. In this depiction the axis OA perpendicular to the image plane of the sensor S and the image of the camera may generally appear in the background of the acquired image, which is often undesirable. A useable/decodable image of the ID code 154 (with a diffuse background) can be acquired in this configuration when the code is off-axis. In this case, the center 170 of the cylindrical object 150 should be located outside that portion of the field of view (within boundaries 183) where the code 154 is located.

However, in operative embodiments, it is contemplated that optics can be arranged at a non-perpendicular angle with respect to the sensor—for example, defining a Scheimpflug configuration, which can allow for extension of the overall depth of field (DOF) and/or avoid a returned reflection from the camera. Such an arrangement is shown and described in commonly assigned U.S. patent application Ser. No. 15/844,448, entitled DUAL-IMAGING VISION SYSTEM CAMERA AND METHOD FOR USING THE SAME, filed Dec. 15, 2017, the teachings of which are incorporated herein by reference as useful background information.

Figure 1A:
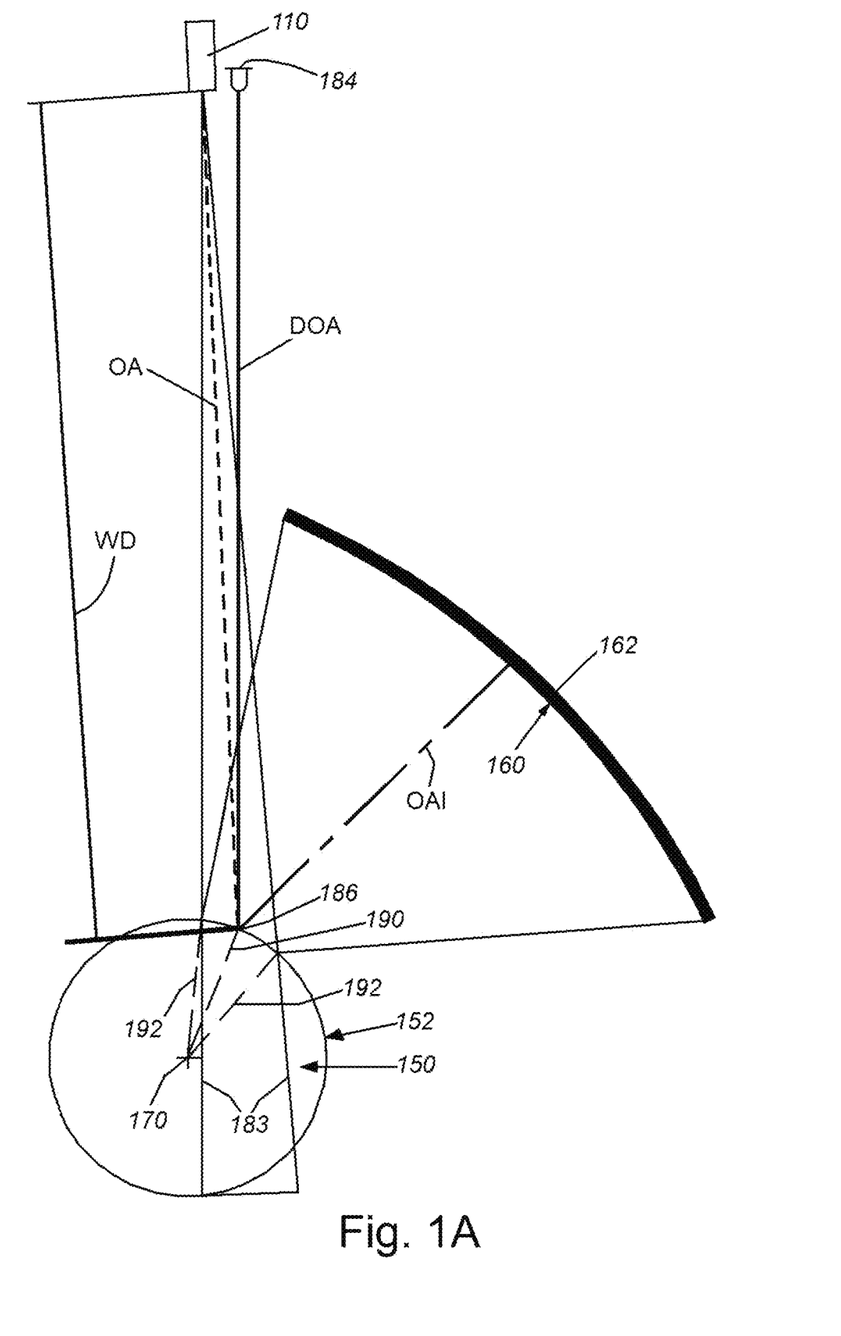
FIG. 1A is a diagram of various axes and distances in association with the vision system configuration of FIG. 1.

Notably, system 100 includes a diffusive illuminator 160, which is adapted particularly to illuminate rounded/curvilinear surfaces, such as the object surface 152. The position and size of the illuminator 160 are each accentuated in the depiction of FIG. 1 for the purposes of illustration and clarity. In various embodiments, the diffusive illuminator can be integrated with the front end of the camera assembly. The diffusive illumination is projected into the field of view (FOV) by the illuminator so that it strikes the surface 152 at a range of angles. This creates a lighting effect that accentuates the DPM code around the curved surface. Such diffusive illumination can be generated by different types of techniques. The diffuser element 162 can be a standard opal diffuser with LED sources (shown as light source I) that create a uniform luminance surface. The diffusive illuminator can also be a backlighted/side-lighted film, or an electroluminescent foil. The geometry of the diffusive illuminator 160 can be defined as the inside surface of a dome or semi-cylinder (as shown). The depicted dome/semi-cylinder configuration thereby projects a light that is desirable for illuminating shiny cylindrical objects and surfaces. Reference is also made to the simplified diagram of FIG. 1A, which includes a laser aimer 184, placed aside the camera 110 and associated aimer beam DOA, which also serves as the "device optical axis". In the above-described configuration, the working distance WD from the camera assembly 110 to the object surface 150 is typically defined by the crossing of the camera optical axis OA and the illumination diffuser's axis OAI at the point 186. Note that the diffuser's axis OAI can be a relative axis of symmetry or center of curvature for the concave or domed surface of the diffuser element, and is shown centered (equal angles (3) between the adjacent boundary edge (ray 180) of the camera FOV and the outermost boundary edge (ray 182) of the diffusive illuminator 160, and is more generally tilted at a non-perpendicular and non-zero (e.g. acute) angle α. More generally, the device optical axis DOA can be defined by the aimer beam (as shown), or by mechanical features on the vision system housing. Thus, in operating the handheld implementation of the system and method herein, the user directs the aimer beam onto (or in the general region of) the ID code of interest, with the surface of the object approximately perpendicular to the aimer beam (and/or perpendicular to a tangent line/plane of the surface at the point of the code). Note that the mechanical features on the vision system housing that define the Device Optical Axis can include (for example) (a) visible lines on the outside of the housing, (b) the parting line between the parts of the enclosure (where the housing enclosure is formed in halves that are fastened or adhered together during assembly), and/or (c) a flat surface or window on the front side of the housing (i.e. on its code-reading end), recognizing that users can (usually) successfully position a device with a flat front surface or window parallel to the object surface. In such case the direction perpendicular to the front surface of the housing can be considered as the device optical axis. The device optical axis is defined as the preferred reading direction and location, in other words, the reading performance is optimized if the code is on or near the device optical axis and the surface of the object is perpendicular to the device optical axis.

As also depicted in FIG. 1, the location of the feature of interest (e.g. an ID code 154 (FIG. 1)) on the object 150 is at the point 186 where axes OA, OAI and DOA intersect. The relationship of this point 186 to the partial field of view 183, the surface 152 of the object 150 and the object center 170 is also defined by depicted dashed lines 190 and 192.

Note that the arrangement of the diffuser's optical axis OAI versus camera optical axis OA is termed "off-axis" in that the illumination is aligned at a non-zero angle with respect to the camera optical axis. This varies from an on-axis illumination arrangement, in which illumination is directed at a zero angle (i.e. aligned with) the camera optical axis. Note further that the camera assembly 110 can include a conventional (e.g. on-axis) illumination system that directs illumination in a straight line toward the object along the optical axis OA—for example, a set of high-powered LEDs AI arranged around the perimeter of the optics O. An appropriate cover, diffuser and/or filter can be provided over the LEDs—also described below. The LEDs AI can be part of a low-angle-light illumination system that supplements the diffusive illumination. Alternatively, a separate low-angle system can be located on a mounting that is either attached to, or remote from, the system device housing.

Figure 2:
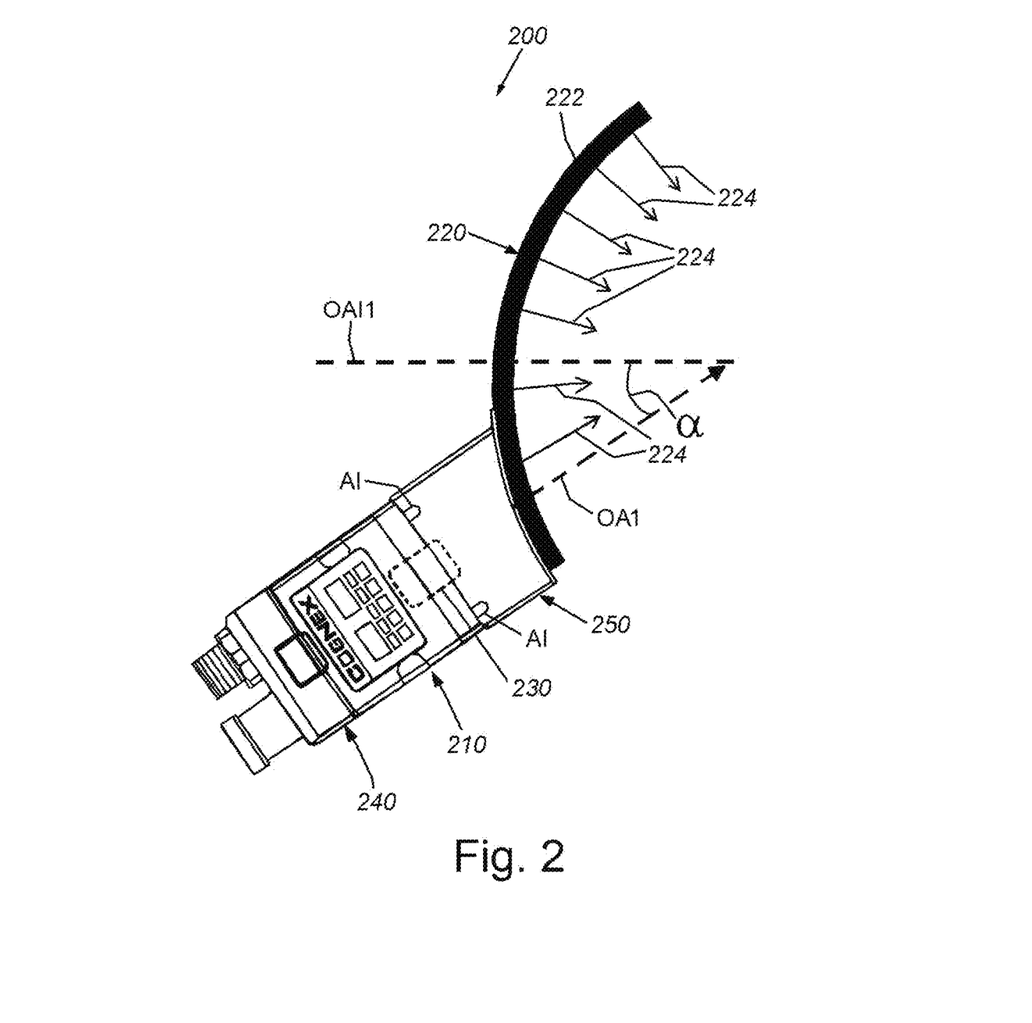
FIG. 2 is a diagram of a vision system camera assembly arranged according to the off-axis configuration of FIG. 1, including an integrated diffuser element on the front end of the camera housing.

Further reference is made to FIG. 2, which shows a vision system arrangement 200, including a camera assembly 210 for reading and decoding ID features provided in the above-described off-axis configuration. This camera assembly can include an on-board vision system processor and associated ID-decoding functional module. The camera assembly 210 also includes an attached/integrated diffusive illuminator 220. The diffuser element or emitter 222 is arranged to provide sufficient coverage on the object surface to illuminate the adjacent background, and hence the ID code features are effectively contrasted—since the projected illumination light 224 arrives at the object from a range of directions based upon the concave geometry of the diffuser element 222. That is, the refractive effect of the diffuser element material, combined with the overall geometry thereof, generates a multidirectional projection of light rays onto each point of the exposed object surface, thus ensuring that the code's features are fully illuminated regardless of the angle about the object circumference at which they occur.

The degree of outward extension and/or radius of curvature of the diffuser element/emitter 222 can vary depending, at least in part, upon the rounded shiny object's radius/curvature, and the ID code size, and these parameters define the above-described angle β that is used to design the diffuser (in which β is located around the diffuser's axis OAI1).

The camera assembly 210 as shown includes a main housing 240 and a front end 250 that surrounds the optics 230. The illumination assembly (AI above) can be directed from the front end 250 into the diffuser element 222, with the front end component 250 acting as a light pipe. The combined front end 250 and diffuser assembly 222 can be integrated into a single attachment that can be removably applied to a universal camera housing (240) with associated, integral illumination AI. It should be clear that this depicted arrangement is exemplary of a variety of assemblies that tie the diffuser element and camera housing together, and provide light to the diffuser element. As described above, in alternate embodiments, the diffuser element is electrically tied to the housing and includes its own embedded illumination source(s).

The illumination assembly can include an aimer (see the embodiment of FIG. 5 below) used in conjunction with a handheld version of the system. The aimer projects a structured light beam (e.g. a dot, cross or line) of an appropriate wavelength and/or visible color onto the object surface so as to guide the user in properly orienting the system device with respect to the object and features of interest (e.g. code). Alternatively, another form of geometrical reference or structure—for example a sighting assembly, printed indicia with instructions on proper orientation and/or a screen with feedback information as to whether the device is properly oriented—can be used to assist a user in orienting the handheld system device.

Figure 3:
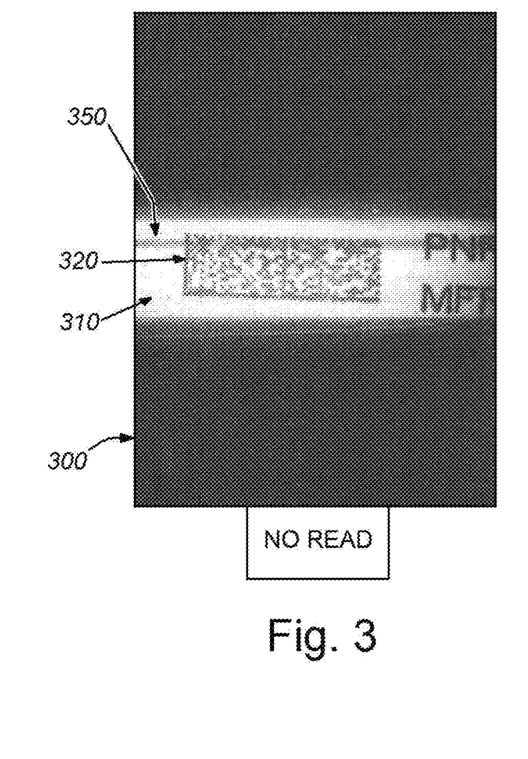
FIGS. 3 and 4 are respective diagrams of an exemplary image of a DPM code on a rounded surface using on-axis and off-axis illumination.
Figure 4:
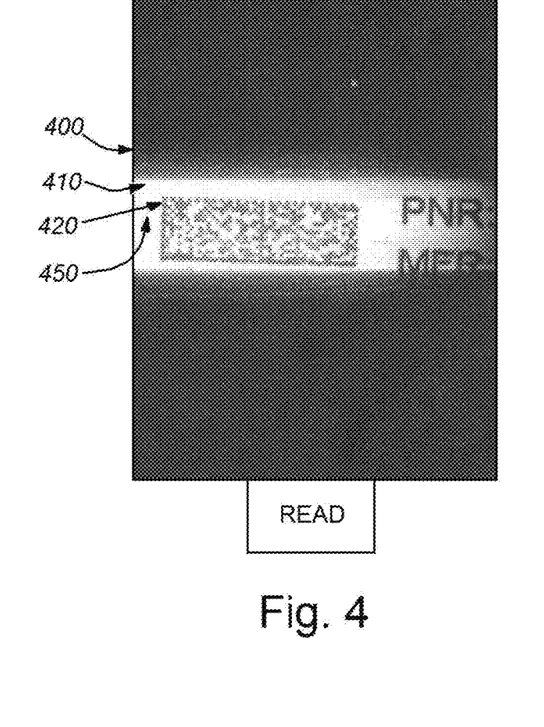

FIGS. 3 and 4 respectively depict images 300 and 400 of an exemplary (e.g. DPM) ID code 320, 420 on a rounded surface (e.g. a cylindrical shaft) 310, 410. The left image 300 is acquired using a conventional on-axis illuminator in association with a vision system camera assembly. The image of the code 320 includes a shadow line 350 that obscures details in the code 320, rendering it unreadable (per the indicator 360). Conversely, using an off-axis illumination arrangement as shown in FIGS. 1 and 2, the right image 400 contains no obscuring shadows or other occlusions in the same region 450, or elsewhere within the imaged object surface. In general, the non-zero angle defined between the overall device optical axis and the optics' optical axis in the off-axis imaging system causes any shadow or footprint of the imaging system to be located is outside of the imaged code 420. Thus, the code 420 is fully readable per the indicator 460. Hence, the off-axis configuration provides a significant advantage in reading feature sets/ID codes on rounded objects.

Figure 5:
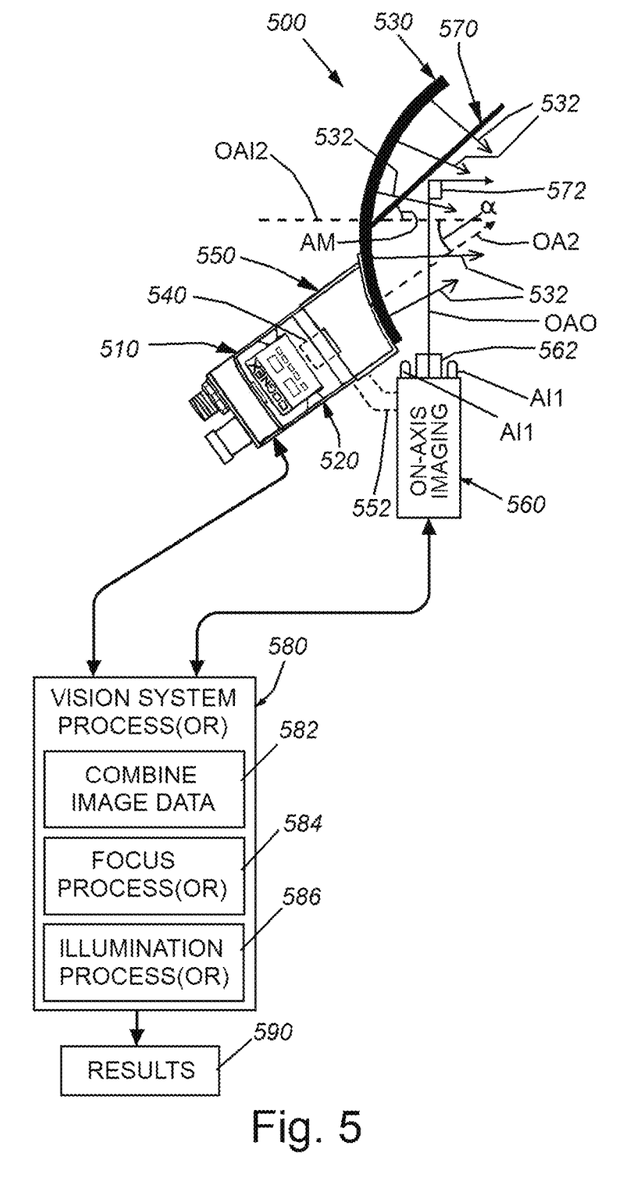
FIG. 5 is a diagram of a vision system camera assembly arranged according to an off-axis configuration, with a further on-axis imaging system that views the object through a dichroic mirror located within the optical path.

In another embodiment, the overall vision system arrangement can include an additional on-axis imaging system that is adapted to provide a second set of image data to the overall vision system, acquired with a different illumination profile. With reference to FIG. 5, a dual-image system arrangement 500 includes a camera assembly 510 with associated housing 520 that can be universal. The front end 550 can include an integrated (curved, concave, etc.) diffuser element 530 as described generally herein, which receives light from the housing 520 and transmits the light 532 in a diffuse form toward the object. The diffuser element 530 defines an axis OAI2 that is arranged at a non-zero (e.g. acute) angle α with respect to the camera optics 540 optical axis OA2.

The front end 550 (or another structure associated with the housing 520) can be adapted to support the second imaging system 560 using an appropriate bracket 552 (shown in phantom), or other member. This on-axis system 560 can be combined in a compact manner with the camera housing 520 using (e.g.) a dichroic filter/mirror 570 placed in front of a portion (upper portion as shown) of the diffuser element 530. The plane of the filter/mirror 570 defines, generally, a 45-degree angle AM with respect to axis OAI2. More particularly, the on-axis system 560 can include an on-axis illumination assembly (e.g. LEDs AI1), which can be implemented (e.g.) as polarized illumination using appropriate filters, etc. The light emitted by the diffusive illuminator can be cross polarized with respect to the on-axis light so that it can be distinguished from the on-axis light. The illumination is, thus, projected along the axis OAO of the optics 562 of the system 560. Illustratively, the wavelength of the on-axis illumination and the diffuse illumination are differentiated from each other by a sufficient degree to allow one of them to be discriminated and attenuated by the dichroic filter 570. The filter 570 is located above the optical axis OA2 of the off-axis camera assembly optics 540 so as to not interfere with image formation therein. The filter 570 allows passage of light 532 from the off-axis diffuser element 530, covering all, or a substantial portion thereof However, the filter 570 is adapted to reflect on-axis illumination (AI1) light received from the object back to the on-axis optics 562. Likewise, on-axis illumination light is reflected onto the object by the filter 570 as shown (with the axis OAO bent at a 90-degree/perpendicular angle 572). Note that a dichroic filter is one of a variety of optical components that can generate a desired light-bending and aligning effect with the two light paths (for each of the imaging systems). In alternate embodiments a beam splitter can be employed, and/or a variety of other arrangements of prisms, mirrors and filters, which should be clear to those of skill.

Illustratively, both the off-axis and on-axis imaging systems/cameras 510 and 560 can include a respective focusing system, such a variable (e.g. liquid) lens, which is provided with respect to the optics 540 and 562. In an embodiment, the off axis system 510 can include a predestined working range in which features are imaged from objects, while the on-axis system can be adapted to image at an indefinite range, so that the overall reading distance of the combined arrangement 500 is extended.

Notably, the on-axis illumination AI1) can function as an aimer, in particular delimiting the field of view of the overall arrangement 500, or the aimer can also be a dedicated light source that defines the device optical axis to guide the user to properly orient the arrangement 500. It is contemplated that the arrangement 500 can be oriented properly using other mechanisms and functions, such as a sighting system, a grip assembly, etc.

The vision system processor 580—which can reside fully or partially within the arrangement's housing 520, or within a remote device (e.g. PC, laptop, tablet, handheld, etc.), is adapted to handle image data from each imaging system/camera 510 and 560. This data can be combined, or otherwise compared, using and appropriate process(or) 582. Image acquisition of data from each imaging system 510, 562 can be sequential or concurrent. Notably, an advantage to the use of a dichroic filter is the ability to acquire images from both systems concurrently, and not sequentially. This saves time in the acquisition process. That is, the received light from the first image system's illuminator (first wavelength) only passes to the first imaging system and received light from the second imaging system's illuminator (second wavelength) only passes to the second imaging system—based upon the differentiating function of the filter. Operation of each illuminator (either sequentially or concurrently) is controlled by the illumination process(or) 586. Additionally, the focus of each imaging system's 510, 560 variable optics 550, 562 is controlled by the focus process(or) 584. Note that one or both of the optics can be fixed in alternate embodiments.

The results 590 that are provided by the arrangement 500 can be based on a successful reading of object features/IDs from either the off-axis or on-axis imaging system. The results can also be based on a combination of features from the two imaging systems, forming a composite image using techniques known to those of skill. In an embodiment, the process(or) 580 can employ a technique that first attempts to decode each image, and then if no successful result is generated from the discrete images, it combines these images and attempts to decode the composite image. Other techniques can be used to employ one or both imaging systems in alternate embodiments to achieve successful reading of features.

It should be clear that the above-described system for illuminating round object surfaces, using an off-axis curved diffuser element provides a more uniform lighting effect, and improved identification of features, such as ID codes. The system can provide enhanced range and versatility by incorporating an additional imaging system with an on-axis illuminator, which can also act as an aimer.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A vision system for imaging an object comprising:
   (a) a first imaging system having a first image sensor and first optics defining a first optical axis with respect to the object;
   (b) a diffusive illumination emitter defining a concave shape along a face thereof facing the object, the concave shape defining a diffuser optical axis discrete from the first optical axis with respect to a center of curvature of the concave shape, in which the diffuser optical axis is intersecting the first optical axis and defining the location of the feature of interest on the object;
   (c) wherein the diffuse illumination is completely located at one side of at least one plane containing the first optical axis; and
   (d) wherein the first imaging system is contained in a housing defining a device optical axis.

2. The vision system as set forth in claim 1 wherein the diffusive illumination emitter defines a dome shape or a semi-cylinder shape.

3. The vision system as set forth in claim 2 wherein the device optical axis is defined with respect to an aimer beam or a mechanical geometric reference on the housing.

4. The vision system as set forth the in claim 1, further comprising a vision system housing adapted for handheld use, and at least one of (a) an aimer illumination source and (b) a mechanical geometric reference that assists a user in orienting the housing with respect to features of interest on the object.

5. The vision system as set forth in claim 4 wherein the mechanical geometric reference comprises at least one of (a) visible lines on the housing, (b) a parting line between parts of the housing, and (c) a flat surface or window on a front side of the housing.

6. The vision system as set forth in claim 4 wherein the object defines a rounded surface and the features of interest comprise an ID code.

7. The vision system as set forth in claim 6 wherein the ID code comprises a DPM code.

8. The vision system as set forth in claim 1 further comprising a second imaging system having a second image sensor and a second optics having a second optical axis, the second optical axis being on-axis with the device optical axis adjacent to the object.

9. The vision system as set forth in claim 8 wherein second imaging system projects a structured-light or collimated-light aimer beam for orienting the vision system with respect to the object.

10. The vision system as set forth in claim 8 wherein the second optical axis is brought together, on-axis, with the device optical axis by an optical component that bends light from a first path to a second path.

11. The vision system as set forth in claim 10 wherein the optical component comprises at least one of a beam splitter and a dichroic filter.

12. The vision system as set forth in claim 11 wherein the diffusive illumination emitter projects light having a first wavelength and the second imaging system projects light having a second wavelength, wherein the first wavelength is discrete from the second wavelength.

13. The vision system, as set forth in claim 12 wherein the light projected by the second imaging system is polarized in a first direction, and the second imaging system is sensitive to polarized light in a direction approximately perpendicular to the first direction.

14. The vision system as set forth in claim 13 wherein the structured-light or collimated-light aimer beam is polarized in a first direction, and the second imaging system is sensitive to polarized light in a direction perpendicular to the first direction.

15. The vision system as set forth in claim 8 wherein the first image sensor and first optics is configured in a Scheimpflug configuration with respect to the device optical axis.

16. The vision system as set forth in claim 8 wherein at least one of the first optics and the second optics includes an adjustable-focus variable lens.

17. The vision system as set forth in claim 16 wherein the variable lens comprises a liquid lens.

18. The vision system as set forth in claim 1 wherein at least one of the first optics and the second optics includes an adjustable-focus variable lens.

19. The vision system as set forth in claim 1, further comprising a low-angle light illumination system.

20. A vision system for imaging an object comprising:
   (a) a first imaging system having a first image sensor and first optics defining a first optical axis with respect to the object;
   (b) a diffusive illumination emitter defining a concave shape along a face thereof facing the object, the concave shape defining a diffuser optical axis discrete from the first optical axis with respect to a center of curvature of the concave shape, in which the diffuser optical axis is intersecting the first optical axis and defining the location of the feature of interest on the object;
   (c) a second imaging system having a second image sensor and a second optics having a second optical axis, the second optical axis being on-axis with the device optical axis adjacent to the object;
   (d) wherein the diffuse illumination is completely located at one side of at least one plane containing the first optical axis; and
   (e) wherein the first imaging system is contained in a housing defining a device optical axis.

21. A vision system for imaging an object comprising:
(a) a first imaging system having a first image sensor and first optics defining a first optical axis with respect to the object;
(b) a diffusive illumination emitter defining a concave shape along a face thereof facing the object, the concave shape defining a diffuser optical axis discrete from the first optical axis with respect to a center of curvature of the concave shape, in which the diffuser optical axis is intersecting the first optical axis and defining the location of the feature of interest on the object;
a low-angle light illumination system;
(c) wherein the diffuse illumination is completely located at one side of at least one plane containing the first optical axis; and
(d) wherein the first imaging system is contained in a housing defining a device optical axis.

\* \* \* \* \*